US007666250B1

(12) United States Patent
Blencoe et al.

(10) Patent No.: US 7,666,250 B1
(45) Date of Patent: Feb. 23, 2010

(54) PRODUCTION OF MAGNESIUM METAL (75) Inventors: James G. Blencoe, Harriman, TN (US);
Lawrence M. Anovitz, Knoxville, TN
(US); Donald A. Palmer, Oliver
Springs, TN (US); James S. Beard,
Martinsville, VA (US)

(73) Assignees: UT-Battelle, LLC, Oak Ridge, TN (US);
**University of Tenessee Research
Foundation**, Knoxville, TX (US);
**Virginia Museum of Natural History
Foundation**, Martinsville, VA (US)

( * ) Notice: Subject to any disclaimer, the term of this
patent is extended or adjusted under 35
U.S.C. 154(b) by 674 days.

(21) Appl. No.: 11/119,536

(22) Filed: Apr. 29, 2005

Related U.S. Application Data

(63) Continuation-in-part of application No. 10/706,583, filed on Nov. 12, 2003, now abandoned.

(60) Provisional application No. 60/566,993, filed on Apr. 30, 2004.

(51) Int. Cl.
*C22B 26/22* (2006.01)
(52) U.S. Cl. ........................................................ 75/594
(58) Field of Classification Search ................... 75/594
See application file for complete search history.

(56) References Cited

U.S. PATENT DOCUMENTS

| 3,770,475 | A |   | 11/1973 | Wuhrer et al. ............... 106/306 |
| 4,124,683 | A |   | 11/1978 | Lalancette ................... 423/166 |
| 4,478,796 | A |   | 10/1984 | Lalancette et al. ........... 423/155 |
| 5,090,996 | A | * | 2/1992  | Cameron .................... 75/10.19 |
| 5,279,716 | A | * | 1/1994  | Sharma ....................... 205/404 |
| 5,803,947 | A | * | 9/1998  | Engell et al. ................. 75/10.33 |
| 2005/0002847 | A1 | * | 1/2005 | Maroto-Valer et al. ....... 423/432 |

FOREIGN PATENT DOCUMENTS

CA     2255287 A1    11/2000

(Continued)

OTHER PUBLICATIONS

Dictionary.com, "serpentine," in Dictionary.com Unabridged (v 1.1). Source location: Random House, Inc. http://dictionary.reference.com/browse/serpentine. Available: http://dictionary.reference.com. Accessed: Feb. 17, 2009.*
Seifritz, "CO2 disposal by means of silicates", Nature, vol. 345, Jun. 7, 1990.

(Continued)

*Primary Examiner*—George Wyszomierski
*Assistant Examiner*—Tima M McGuthry-Banks
(74) *Attorney, Agent, or Firm*—MacMillan, Sobanski & Todd, LLC (57) ABSTRACT

A process of producing magnesium metal includes providing magnesium carbonate, and reacting the magnesium carbonate to produce a magnesium-containing compound and carbon dioxide. The magnesium-containing compound is reacted to produce magnesium metal. The carbon dioxide is used as a reactant in a second process. In another embodiment of the process, a magnesium silicate is reacted with a caustic material to produce magnesium hydroxide. The magnesium hydroxide is reacted with a source of carbon dioxide to produce magnesium carbonate. The magnesium carbonate is reacted to produce a magnesium-containing compound and carbon dioxide. The magnesium-containing compound is reacted to produce magnesium metal. The invention further relates to a process for production of magnesium metal or a magnesium compound where an external source of carbon dioxide is not used in any of the reactions of the process. The invention also relates to the magnesium metal produced by the processes described herein.

12 Claims, 3 Drawing Sheets

A simplified flowchart for the production of magnesium metal from serpentine according to the invention, with magnesium electrowinning by electrolysis of $MgCl_2$ (step 6).

FOREIGN PATENT DOCUMENTS

| EP | 0070711 A1 | 1/1983 |
|---|---|---|
| JP | 54058247 A * | 5/1979 |
| WO | WO 94/12266 | 6/1994 |
| WO | WO 01/34294 A1 | 5/2001 |
| WO | WO 02/085788 A1 | 10/2002 |

OTHER PUBLICATIONS

Lackner et al., "Magnesite Disposal of Carbon Dioxide", 22nd International Technical Conference on Coal Utilization and Fuel System, pp. 1-12, Mar. 16, 1997.

Lackner et al., "Carbon Dioxide Disposal in Carbonate Minerals", Energy, vol. 20, No. 11, pp. 1153-1170, 1995.

Lackner et al., "Progress on Binding CO2 in Mineral Substrates", Energy Convers. Mgmt., vol. 38, suppl., pp. S259-S264, 1997.

Goff et al., "Carbon Dioxide Sequestering Using Ultramafic Rocks", Environmental Geosciences, vol. 5, No. 3, pp. 89-101, 1998.

Lackner, "A Guide to CO2 Sequestration", Science, vol. 300, pp. 1677-1678, Jun. 13, 2003.

Goldberg et al., "A Program to Develop CO2 Sequestration via Mineral Carbonation", Proceedings of the 6th International Conference on Greenhouse Gas Control Technologies, Kyoto, Japan, pp. 1-6, Oct. 1, 2002.

Haywood et al., "Carbon dioxide sequestration as stable carbonate minerals—environmental barriers", Environmental Geology, Springer-Verlag (http://link.springer.de), 10 pages, Aug. 21, 2001.

Gerdemann et al., "Carbon Dioxide Sequestration by Aqueous Mineral Carbonation of Magnesium Silicate Minerals", Proceedings of the 6th International Conference on Greenhouse Gas Control Technologies, Kyoto, Japan, pp. 1-6, Oct. 1, 2002.

Guthrie et al., "Geochemical Aspects of the Carbonation of Magnesium Silicates in an Aqueous Medium", NETL Conference on Carbon Sequestration, pp. 1-14, 2001.

Xiaoding et al., "Mitigation of CO2 by Chemical Conversion: Plausible Chemical Reactions and Promising Products", Energy and Fuels, vol. 10, pp. 305-325, 1996.

Butt et al., "A Method for Permanent Diposal of CO2 in Solid Form", World Resource Review, vol. 9, No. 3, pp. 324-336, 1997.

Smithson et al., "Kinetics and Mechanism of Carbonation of Magnesium Oxide Slurries", Ind. Eng. Chem. Process Des. Develop, vol. 12, No. 1, pp. 99-106, 1973.

Bearat et al., "Magnesium Hydroxide Dehydroxylation/Carbonation Reaction Processes: Implications for Carbon Dioxide Mineral Sequestration", J. Am. Ceram. Soc., vol. 85, No. 4, pp. 742-748, 2002.

Wu et al., "Feasibility of CO2 Fixation via Artificial Rock Weathering", Ind. Eng. Chem. Res., vol. 40, pp. 3902-3905, 2001.

Jia et al., "Mineral Carbonation and ZECA", Proceedings of the 6th International Conference on Greenhouse Gas Control Technologies, Kyoto, Japan, pp. 1-6, Oct. 1, 2002.

Kakizawa et al., "A new CO2 disposal process via artificial weathering of calcium silicate accelerated by acetic acid", Energy, vol. 26, pp. 341-354, 2001.

O'Connor et al., "Carbon Dioxide Sequestration: Aqueous Mineral Carbonation Studies Using Olivine and Serpentine", Albany Research Center, National Energy Technology Laboratory: Mineral Carbonation Workshop, Aug. 8, 2001.

Kojima et al., "Absorption and Fixation of Carbon Dioxide by Rock Weathering", Energy Convers. Mgmt., vol. 38, pp. S461-S466 (1997).

O'Connor et al., "Carbon Dioxide Sequestration by Direct Mineral Carbonation: Results from Recent Studies and Current Status", Proceedings of First National Conference on Carbon Sequestration, May 14, 2001.

* cited by examiner

Figure 1. A simplified flowchart for the production of magnesite (MgCO$_3$) from serpentine (Mg$_3$Si$_2$O$_5$(OH)$_4$) by a mineral carbonation process that can be used as part of the invention.

Figure 2. A simplified flowchart for the production of magnesium metal from serpentine according to the invention, with magnesium electrowinning by electrolysis of $MgCl_2$ (step 6).

Figure 3.  A simplified flowchart for the production of magnesium from serpentine according to the invention, with magnesium electrowinning by electrolysis of MgO (step 5).

PRODUCTION OF MAGNESIUM METAL

CROSS-REFERENCE TO RELATED APPLICATIONS

This application claims the benefit of U.S. provisional application Ser. No. 60/566,993, filed Apr. 30, 2004. This application is a continuation-in-part of U.S. utility application Ser. No. 10/706,583, now abandoned filed Nov. 12, 2003.

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

This invention relates in general to processes of producing magnesium metal. The two main methods for producing magnesium metal involve reduction of either the oxide or the chloride. The first of these, known as the Pidgeon process, requires a strong reducing agent (usually silicon or ferrosilicon) and high temperatures (well over 1000° C.). The second route, which until recently was the principal means of magnesium production, relies on the electrolysis of molten magnesium chloride, producing chlorine gas at the anode. The magnesium chloride required for the fused salt electrolysis can in turn be produced in several ways. The most direct method involves separation from seawater, or evaporation of natural brines, usually from salt lakes. Alternatively, magnesium chloride can be produced by treatment of magnesium carbonate (magnesite), magnesium oxide, or a magnesium silicate (especially serpentine) by aqueous hydrochloric acid, as in the Magnola process. A process developed by the Australian Magnesium Corporation involves removal of water by azeotropic distillation with ethylene glycol, following which the magnesium chloride is precipitated from glycol solution as the hexammoniate by treatment with ammonia, and the ammoniate is decomposed to anhydrous magnesium chloride by heating. Yet another alternative process that avoids the need for the dehydration step is carbochlorination, whereby magnesium oxide is reacted with chlorine in the presence of carbon, producing magnesium chloride. A version of this reaction that involves magnesite in place of magnesia was the basis for the operation of a magnesium plant in Alberta, Canada. The direct electrolytic decomposition of MgO to Mg and $O_2$, in a cell containing an oxide-ion conducting ceramic electrolyte, is also possible (the EIMEx process).

A common feature of the current technologies for the production of magnesium is the generation of $CO_2$. Thus, production of magnesium chloride from magnesite by either calcination or acid treatment involves the evolution of one mole of $CO_2$ per mole of magnesium chloride, and if dolomite is used there are two moles of $CO_2$ produced; the same is also true for the carbochlorination of magnesite. Although the oxygen in the magnesia feedstock for the silicothermic reduction process is removed as silicon dioxide, large quantities of $CO_2$ are released in the production of the ferro-silicon reductant, and in the generation of the high temperatures that are required for the reaction to proceed.

Thus, it is desirable to develop an improved process of producing magnesium metal.

SUMMARY OF THE INVENTION

The present invention relates to a process of producing magnesium metal. Magnesium carbonate is provided. The magnesium carbonate is reacted to produce a magnesium-containing compound and carbon dioxide. The magnesium-containing compound is reacted to produce magnesium metal. The carbon dioxide is used as a reactant in a second process.

The invention also relates to a process of producing magnesium metal in which a magnesium-containing compound is reacted in an industrial-scale reactor to produce magnesium metal. The process results in substantially no net production of carbon dioxide or chlorine.

The invention also relates to a system for producing at least one of magnesium carbonate and magnesium metal. A first subsystem comprises: (a) a supply of a magnesium silicate entering the first subsystem; (b) reaction apparatus that converts the magnesium silicate to magnesium carbonate with the use of carbon dioxide; and (c) apparatus for exiting the magnesium carbonate from the first subsystem in order to sequester the carbon dioxide in the magnesium carbonate. A second subsystem comprises: (a) apparatus for conveying the magnesium carbonate from the first subsystem to the second subsystem; (b) apparatus for reacting the magnesium carbonate to produce a magnesium-containing compound and carbon dioxide; (c) apparatus for recycling the carbon dioxide from the second subsystem to the first subsystem; and (d) apparatus for reacting the magnesium-containing compound to produce magnesium metal.

The invention also relates to a system for producing magnesium metal in which a supply of a magnesium silicate enters the system. Reaction apparatus converts the magnesium silicate to magnesium metal, with substantially no net production of carbon dioxide or chlorine. The magnesium metal exits the system as a product.

The invention also relates to a process of producing magnesium metal in which a magnesium silicate is reacted with a caustic material to produce magnesium hydroxide. The magnesium hydroxide is reacted with a source of carbon dioxide to produce magnesium carbonate. The magnesium carbonate is reacted to produce a magnesium-containing compound and carbon dioxide. The magnesium-containing compound is reacted to produce magnesium metal.

The invention also relates to a process of producing magnesium metal comprising: (a) reacting a magnesium silicate with a caustic material to produce magnesium hydroxide; (b) reacting carbon dioxide with at least one of a caustic alkali-metal hydroxide and an alkali-metal silicate to produce at least one of an alkali-metal carbonate and an alkali-metal bicarbonate; (c) reacting the magnesium hydroxide with at least one of the alkali-metal carbonate and the alkali-metal bicarbonate to produce magnesium carbonate; (d) reacting the magnesium carbonate to produce a magnesium-containing compound and carbon dioxide; and (e) reacting the magnesium-containing compound to produce magnesium metal.

The invention further relates to a process for production of magnesium metal or a magnesium compound where an external source of carbon dioxide is not used in any of the reactions of the process.

The invention further relates to the magnesium metal produced by any of the above-described processes.

DETAILED DESCRIPTION OF THE PREFERRED EMBODIMENTS

Figure 1:
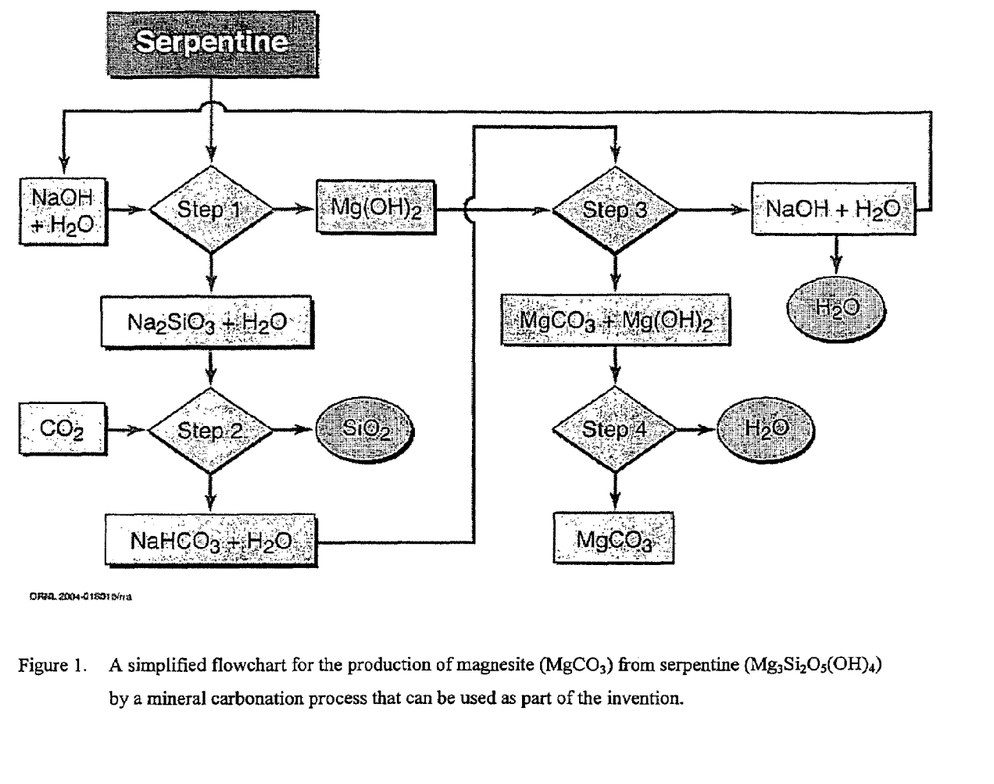
FIG. 1 is a simplified flowchart for the production of magnesium carbonate from serpentine by a mineral carbonation process that can be used as part of the invention.
Figure 2:
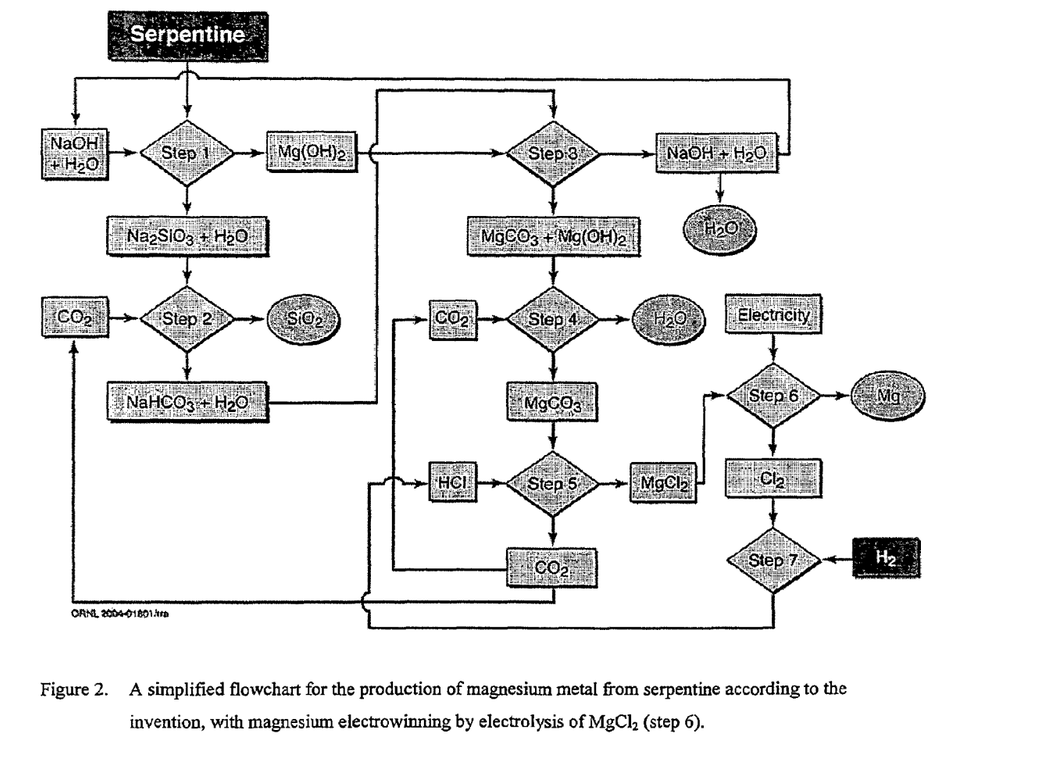
FIG. 2 is a simplified flowchart for the production of magnesium metal from serpentine according to one embodiment of the invention.
Figure 3:
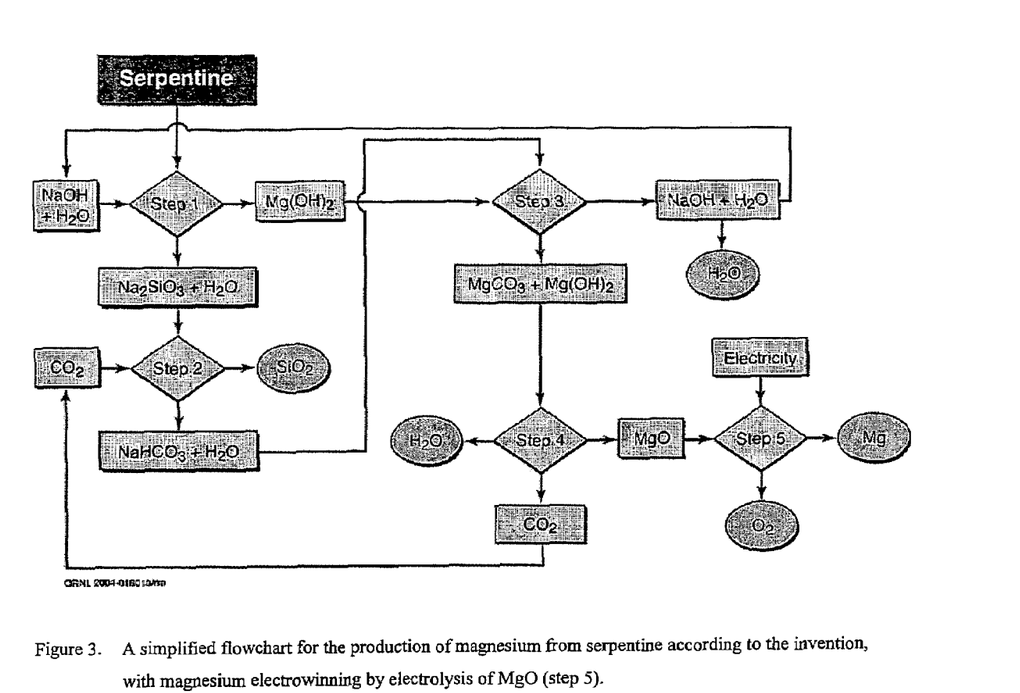
FIG. 3 is a simplified flowchart for the production of magnesium metal from serpentine according to another embodiment of the invention.

The invention relates to an improved process of producing magnesium metal. Initially, magnesium carbonate (magnesite, $MgCO_3$) is provided as a reactant for the process. The magnesium carbonate can be provided in any suitable manner. For example, it can be purchased from a chemical supplier, or it can be provided as the product of a preceding chemical process. FIGS. 1 and 2 illustrate an embodiment of the invention in which the magnesium carbonate is provided as a product of Step 4 of a mineral carbonation process, and FIG. 3 illustrates an embodiment in which magnesium carbonate and magnesium dihydroxide (brucite, $Mg(OH)_2$) are provided as products of a mineral carbonation process. The mineral carbonation process will be discussed in more detail below.

The magnesium carbonate is reacted to produce a magnesium-containing compound and carbon dioxide. Any suitable reactions, co-reactants and reaction conditions can be used. In some embodiments, the magnesium-containing compound is either magnesium chloride ($MgCl_2$) or magnesium oxide (MgO), the two primary industrial feedstocks for producing magnesium metal by electrolysis or thermal reduction. In the embodiment shown in FIG. 2, the magnesium carbonate is reacted with HCl in Step 5 to produce $MgCl_2$ and carbon dioxide by the reaction:

$$MgCO_3 + 2HCl + 5H_2O \rightarrow MgCl_2 \cdot 6H_2O(\downarrow) + CO_2(gas). \qquad (1)$$

[Note: The label "$MgCl_2$" in the rectangle to the right of Step 5 in FIG. 2 represents the chloride salt $MgCl_2 \cdot xH_2O$, where x is a number between 0 and 6. The partial/complete dehydration of $MgCl_2 \cdot 6H_2O$ typically performed prior to electrolysis is not shown in FIG. 2 for the sake of simplicity and generality in graphically representing the processing steps that produce magnesium metal from $MgCl_2 \cdot 6H_2O$.] In the embodiment shown in FIG. 3, the $MgCO_3 + Mg(OH)_2$ product stream from Step 3 of the mineral carbonation process is calcined in Step 4 to produce MgO, carbon dioxide and water. The product stream from the mineral carbonation process is readily transformed to either magnesium chloride hexahydrate ($MgCl_2 \cdot 6H_2O$) or magnesium oxide (MgO)—both of which can be used to produce magnesium metal by electrolysis or thermal reduction.

The magnesium-containing compound is then reacted to produce magnesium metal. Any suitable reactions, co-reactants and reaction conditions can be used. In the embodiment shown in FIG. 2, the $MgCl_2$ is subjected to electrolysis in Step 6 to produce magnesium metal (Mg) and chlorine gas. In the embodiment shown in FIG. 3, the MgO is subjected to hydrolysis in Step 5 to produce magnesium metal and oxygen gas. FIGS. 2 and 3 show that the mineral carbonation process, which can be used as part of the invention, is highly compatible with technologies for extracting magnesium metal from $MgCl_2 \cdot 6H_2O$ and MgO.

The carbon dioxide that is produced along with the magnesium-containing compound is used as a reactant in another process. Advantageously, this reduces or eliminates the emission of carbon dioxide from the overall process. In some embodiments, the process results in substantially no net production of carbon dioxide. The other process can be any type of process that consumes carbon dioxide. For example, the other process can be a mineral carbonation process. In some embodiments, the carbon dioxide is recycled such that the mineral carbonation process provides the magnesium carbonate that is used as a reactant in the present process.

An example of a mineral carbonation process that can be used in the invention is described in U.S. application Ser. No. 10/706,583, filed Nov. 12, 2003, which is incorporated by reference herein. FIGS. 1-3 illustrate this process used for the carbonation of serpentine to produce magnesium carbonate ($MgCO_3$) and brucite ($Mg(OH)_2$). This serpentine carbonation process, used as part of the magnesium metal production process of the invention, affords the benefit that complete internal recycling of $CO_2$ is achieved, thereby decreasing or eliminating the amount of $CO_2$ emitted to the atmosphere. This stands in marked contrast to conventional magnesium metal production technologies, which emit copious amounts of $CO_2$.

The mineral carbonation process described in U.S. application Ser. No. 10/706,583 can be used to carbonate many different types of metal-silicate feedstocks, including naturally occurring silicates such as those present in rocks and clay-rich formations, as well as silicates present in industrial waste products such as fly ash and waste concrete. Typically, the metal-silicate feedstock is composed of one or more calcium silicates, magnesium silicates, iron-bearing silicates (such as basalt), or mixtures thereof, although other types of silicates can also be used. (Silicate feedstocks are referred to collectively herein as "metal silicates" with the understanding that this designation includes any natural or man-made material, in the crystalline or amorphous state, that contains at least one metal along with silicon. By this definition, aluminosilicates are metal silicates because they contain a metal, aluminum, along with silicon.)

Magnesium-rich silicates include olivine (specifically forsterite, $Mg_2SiO_4$), serpentine [$Mg_3Si_2O_5(OH)_4$], and basalt. Significant masses of olivine- and serpentine-bearing rocks exist around the world, particularly in ultramafic complexes, and in large serpentinite bodies.

In one embodiment of the mineral carbonation process, one or more metal silicates are transformed to one or more solid hydroxides by reaction with a caustic alkali-metal hydroxide, such as caustic soda (NaOH), in aqueous solution. In other words, the metal silicate(s) react with the caustic alkali-metal hydroxide to produce a hydroxide of the metal formerly contained in the silicate. This initial reaction is usually followed by physical and chemical segregation of the produced solid(s) and "depleted" caustic liquid. In addition, it may be desirable to separate the solid metal hydroxide(s) from any residual solid silicate and/or oxide material that forms as a byproduct of caustic digestion.

Any suitable concentration of the caustic alkali-metal hydroxide in aqueous solution can be used to decompose the metal-silicate feedstock, including highly concentrated and very dilute solutions. The caustic solution is typically fairly concentrated, comprising, by weight, from about 30% to about 80% alkali-metal hydroxide and from about 20% to about 70% water.

In the final step of the process, the metal hydroxide formed in the first step is reacted with alkali-metal carbonate (e.g., sodium carbonate) and/or alkali-metal bicarbonate (e.g., sodium bicarbonate) to produce a carbonate of the metal formerly contained in the metal silicate. This reaction can be induced at any suitable set of temperature-pressure conditions.

An intermediate step in the process involves reacting carbon dioxide with caustic alkali-metal hydroxide (e.g., NaOH) and/or alkali metal silicate (e.g., $Na_2SiO_3$) to produce alkali-metal carbonate (e.g., $Na_2CO_3$) and/or alkali-metal bicarbonate (e.g., $NaHCO_3$), ±water and/or silica in either gelatinous or solid form. This step may or may not be followed by precipitation of the $Na_2CO_3$ and/or $NaHCO_3$, which could be achieved by shifting the pH of the aqueous solution, or by evaporating off some of the water present.

The caustic material produced in the intermediate step of the process can usually be recycled back into the first step of the process. Thus, more generally, the process of carbonating a metal silicate comprises the steps of: (a) reacting the metal silicate with a caustic material to produce a hydroxide of the metal; (b) reacting the metal hydroxide with a source of carbon dioxide to produce a carbonate of the metal and to produce reconstituted caustic material; and (c) introducing the caustic material from step (b) into step (a). The caustic material can be a caustic alkali-metal hydroxide or any other suitable caustic material.

The intermediate and final steps of the process may be conducted at a pressure not greater than about 50 bars above the vapor pressure of pure water for the temperature of these two steps, typically not greater than about 30 bars, and more typically not greater than about 20 bars, and often not greater than about 10 bars. The initial step may be conducted at a pressure slightly below the vapor pressure of pure water for the temperature of that step. Achieving rapid chemical reaction at low pressure is an advantage because relatively thin-walled pressure chambers will suffice to safely contain the aqueous liquids (±gas) as reaction proceeds. This will reduce the costs of commercial reactors built to implement the process on an industrial scale. Moreover, when total pressure is equal to the vapor pressure of the liquid phase, no investments in expensive pressure-intensifying equipment are required. On the other hand, higher fluid (liquid and/or gas) pressures at each step, particularly the intermediate step, could lead to more rapid and efficient chemical reaction, in which case additional capital expenditures to make the carbonation reactor more structurally robust, and to procure suitable pumping equipment, might be cost effective.

More generally, the process of carbonating a metal silicate comprises reacting at least the metal silicate and a source of carbon dioxide to produce a carbonate of the metal, wherein the reaction is conducted at a pressure not greater than about 50 bars above the vapor pressure of pure water for the temperature of the reaction.

However, it may be beneficial to pressurize the $CO_2$-bearing gas to a level above the vapor pressure of pure water for the temperature of the step in which it is reacted, prior to, or during, production of metal carbonate(s) and/or metal bicarbonate(s) in order to accelerate rates of carbonation. If $CO_2$ is captured, separated and liquified by a another process, then pressures up to ~64 atm (the vapor pressure of pure liquid $CO_2$ at 25° C.) could be achieved simply by throttling flow of $CO_2$ into the pressure chamber used to achieve carbonation.

In each step of the process, the extent to which aqueous liquids are agitated or stirred, and control of the proportions of phases as reaction proceeds, can be varied.

More generally, the process of carbonating a metal silicate comprises the steps of: (a) reacting the metal silicate with a caustic alkali-metal hydroxide to produce a hydroxide of the metal formerly contained in the silicate; and (b) reacting the metal hydroxide with a source of carbon dioxide to produce a carbonate of the metal formerly contained in the metal silicate of step (a). A process of producing a metal carbonate comprises reacting an alkaline-earth metal hydroxide with at least one of an alkali-metal carbonate, an alkali-metal bicarbonate, and carbon dioxide, to produce a carbonate of the metal formerly contained in the metal hydroxide.

Some examples of reaction pathways are shown below for producing magnesium carbonate (magnesite, $MgCO_3$) from the magnesium-rich minerals olivine (specifically forsterite, $Mg_2SiO_4$) and serpentine [$Mg_3Si_2O_5(OH)_4$]. The Reactions (5)-(8) for carbonating serpentine are also illustrated in FIGS. 1-3 as Steps 1-4.

(2)

olivine                brucite

(3)

(4)

brucite                magnesite

[Net reaction: $Mg_2SiO_4 + 2CO_2 \longrightarrow 2MgCO_3(\downarrow) + SiO_2(\downarrow)$].

(5)

serpentine             brucite (6)

(7)

brucite                magnesite

(8)

brucite                magnesite

[Net reaction: $Mg_3Si_2O_5(OH)_4 + 3CO_2 \rightarrow 3MgCO_3(\downarrow) + 2SiO_2(\downarrow) + 2H_2O(liq)$].

In Reaction (5), no heat pretreatment of the serpentine is required to achieve rapid and efficient production of $Mg(OH)_2$. This contrasts sharply with the so-called "direct" method for carbonating serpentine (by the reaction $Mg_3Si_2O_5(OH)_4 + 3CO_2 \rightarrow 3MgCO_3 + 2SiO_2 + 2H_2O$), which requires heat pretreatment of the serpentine at ~600° C. to drive off structurally bound water. This extra step is necessary in the direct method of carbonating serpentine because water-bearing (hydroxylated) serpentine reacts sluggishly with $CO_2$, whereas dewatered (dehydroxylated) serpentine is highly reactive. Dehydroxylation of serpentine makes the direct carbonation method very energy intensive and costly. In this regard, it is also noteworthy that the present process, as applied to either olivine or serpentine, completely conserves the "rock solvent" (e.g., NaOH), which lowers overall processing costs. By contrast, in the direct method for carbonating serpentine and olivine, the rock solvent is (effectively) compressed, supercritical $CO_2$, which is expensive to create due to the high capital and operating costs of the mechanical pumping that is required to achieve pressures as high as 185 atm.

It should be understood that the chemical formulae for the solutes (substances dissolved in aqueous solution) in Reactions (2)-(4) and (5)-(8) (specifically NaOH, $Na_2SiO_3$ and $NaHCO_3$) represent stoichiometric components in aqueous solution, not "real" aqueous species. This convention was adopted for the sake of generality and simplicity. The particular species in aqueous solution created by the process (presently unknown) are of considerable scientific interest; however, they need not be represented explicitly in sets of process reactions such as those above, because the solids that form and disappear in each process reaction, as well as the net carbonation reaction for each metal silicate, do not depend on the chemical formulae that are used to represent the compositions of solutes. A simple example serves to illustrate this point. In Reactions (2)-(4), the stoichiometric components NaOH, $Na_2SiO_3$ and $NaHCO_3$ can be replaced by the ionic species $OH^-$, $SiO(OH)_3^-$, and $HCO_3^-$, with sodium ion omitted because it is neither consumed nor produced in any reaction. This leads to the following alternative carbonation pathway for forsteritic olivine:

$$Mg_2SiO_4 + OH^- + 3H_2O \rightarrow 2Mg(OH)_2 + SiO(OH)_3^- \quad (9)$$

$$SiO(OH)_3^- + CO_2 \rightarrow HCO_3^- + SiO_2(\downarrow) + H_2O \quad (10)$$

$$Mg(OH)_2 + HCO_3^- \rightarrow MgCO_3(\downarrow) + OH^- + H_2O \quad (11)$$

$$Mg(OH)_2 + CO_2 \rightarrow MgCO_3(\downarrow) + H_2O \quad (12)$$

[Net reaction: $Mg_2SiO_4 + 2CO_2 \rightarrow 2MgCO_3(\downarrow) + SiO_2(\downarrow)$].

Comparing Reactions (9)-(12) with Reactions (2)-(4), it is evident that the solids consumed and produced, and the net reaction, are identical. Therefore, it should be clearly understood that the scope of the process for carbonating metal silicates includes various self-consistent sets of reactions—i.e., sets of reactions involving the same solids, with metal silicate digestion by one or more caustic metal hydroxides (such as NaOH)—wherein solutes are represented by aqueous species of varying composition and charge, rather than by stoichiometric components.

In another embodiment, the process provides a means for carbonating magnesium and iron silicates in two steps. In step 1, the metal silicate(s) is (are) converted to $Mg(OH)_2$ and/or iron hydroxides(s)+$Na_2SiO_3 \pm SiO_2$ by reaction with caustic soda in aqueous solution. When this conversion is essentially complete, carbonation of $Mg(OH)_2$ and/or iron hydroxide(s) is (are) achieved by injecting $CO_2$ into the aqueous solution to form $NaHCO_3$ ($\pm Na_2CO_3$)+silica gel and/or solid silica (step 2). $MgCO_3$ is formed when the $Mg(OH)_2$ produced in step 1 reacts with $NaHCO_3$ ($\pm Na_2CO_3$) and/or aqueous $CO_2$. Physical and/or chemical segregation of solids and liquids is not required in the two-step process for carbonating Mg- and Fe-rich silicates.

As described above, when the mineral carbonation process, or another process that uses carbon dioxide as a reactant, is used as part of the process of producing magnesium metal according to the invention, the emission of carbon dioxide from the overall process is reduced or eliminated. It should further be noted that the process of producing magnesium metal can be practiced without causing emissions of chlorine, in contrast to many industrial magnesium manufacturing processes that emit undesirable amounts of chlorine. For example, in FIG. 2 it is shown that the chlorine produced in Step 6 of the process is recycled as a reactant in Step 5 of the process, thereby avoiding the emission of chlorine from the process. Thus, more generally, the invention relates to a process of producing magnesium metal comprising reacting a magnesium-containing compound in an industrial-scale reactor to produce magnesium metal, the resulting process resulting in substantially no net production of carbon dioxide or chlorine. As illustrated, for example in FIGS. 2 and 3, in some embodiments the process includes a reaction that produces silicon dioxide. Further, in some embodiments the process results in substantially no net production of any materials besides the magnesium metal, water, oxygen, and silicon dioxide. Although the invention has been illustrated with respect to specific reactions and processes, the invention also includes other reactions and processes that achieve these results.

The invention also relates generally to a system for producing magnesium metal. The system includes a supply of a magnesium silicate entering the system. For example, a supply of magnesium silicate ore is transported by rail or trucks to a manufacturing plant, where it is used as the feedstock for the magnesium metal manufacturing process of the invention. The system also includes reaction apparatus which converts the magnesium silicate to the magnesium metal, with substantially no net production of carbon dioxide or chlorine. The reaction apparatus includes one or more reactors and related equipment, reactants and other materials used to carry out the magnesium metal production. In some embodiments, the reaction apparatus produces magnesium carbonate as an intermediate product between the magnesium silicate and the magnesium metal, for example, as shown in FIGS. 2 and 3. The system further includes the magnesium metal product, which exits the system for use or sale.

When the mineral carbonation process is used as part of the magnesium metal production process of the invention, a manufacturing plant can be set up that has flexibility in producing either magnesium carbonate or magnesium metal. For example, if it is more attractive economically to use the plant to sequester carbon dioxide, the plant can receive a supply of carbon dioxide and use the mineral carbonation process to sequester the carbon dioxide by producing magnesium carbonate. The magnesium carbonate can then be disposed of by burial or other means. Alternatively, if it is more attractive economically to use the plant to produce magnesium metal, the mineral carbonation process can be used to produce magnesium carbonate, and then the magnesium carbonate can be used as a feedstock for producing magnesium metal as described above. The carbon dioxide produced during the production of the magnesium metal is recycled as a reactant into the mineral carbonation process, so that the process does not emit carbon dioxide. As another alternative, the manufacturing plant can be used partially to sequester carbon dioxide and partially to produce magnesium metal.

Thus, the invention relates to a system for alternatively producing magnesium carbonate (to sequester carbon dioxide) and/or magnesium metal. The system includes a first subsystem comprising: (a) a supply of a magnesium silicate entering the first subsystem; (b) reaction apparatus that converts the magnesium silicate to magnesium carbonate with the use of carbon dioxide; and (c) apparatus for exiting the magnesium carbonate from the first subsystem in order to sequester the carbon dioxide in the magnesium carbonate. The system also includes a second subsystem comprising: (a) apparatus for conveying the magnesium carbonate from the first subsystem to the second subsystem; (b) apparatus for reacting the magnesium carbonate to produce a magnesium-containing compound and carbon dioxide; (c) apparatus for recycling the carbon dioxide from the second subsystem to the first subsystem; and (d) apparatus for reacting the magnesium-containing compound to produce magnesium metal. The second subsystem may be turned on to produce the magnesium metal, and turned off to produce the magnesium carbonate for sequestering carbon dioxide. Preferably, when the second subsystem is turned on, the system results in substantially no net production of carbon dioxide.

The invention further relates to a process for production of magnesium metal or a magnesium compound where an external source of carbon dioxide is not used in any of the reactions of the process. When the process does use carbon dioxide, the carbon dioxide can be generated by the process and recycled for use within the process, thereby eliminating the need for an external source. For example, FIGS. 2 and 3 show the generation and recycling of carbon dioxide within the magnesium production processes. Although this embodiment of the invention has been illustrated with respect to the production of magnesium metal, the invention is also applicable to processes of producing different magnesium compounds.

As shown in FIGS. 2 and 3, serpentine is a preferred magnesium silicate for use is in the magnesium metal production process of the invention. Serpentine occurs widely on all continents and ocean floors, and is not currently used as a magnesium ore. However, because it is extremely rich in magnesium, contains no carbon or chlorine, and is more abundant naturally than three heavily exploited magnesium ores—dolomite ($MgCO_3.CaCO_3$), bischofite ($MgCl_2.6H_2O$) and carnallite ($MgCl_2.KCl.6H_2O$)—serpentine has the potential to become an inexpensive and environmentally benign source of huge amounts of magnesium metal.

With its numerous advantages over alternative magnesium ore-processing technologies—including the use of an abundant magnesium resource that is not currently being exploited, and minimal production of $CO_2$—the process of the invention has the potential to significantly increase world production of magnesium.

In accordance with the provisions of the patent statutes, the principle and mode of operation of this invention have been explained and illustrated in its preferred embodiments. However, it must be understood that this invention may be practiced otherwise than as specifically explained without departing from its spirit or scope.

What is claimed is:

1. A process of producing magnesium metal comprising:
   providing magnesium carbonate;
   reacting the magnesium carbonate to produce a magnesium-containing compound and carbon dioxide;
   reacting the magnesium-containing compound to produce magnesium metal; and
   using the carbon dioxide as a reactant in a mineral carbonation process, wherein the carbon dioxide is recycled such that the mineral carbonation process provides the magnesium carbonate.

2. The process according to claim 1 wherein the process results in substantially no net production of carbon dioxide.

3. The process according to claim 1 wherein the magnesium-containing compound comprises magnesium chloride or magnesium oxide.

4. A process of producing magnesium metal comprising:
   reacting a magnesium-containing compound in an industrial-scale reactor to produce magnesium metal;
   the process resulting in substantially no net production of carbon dioxide or chlorine, and wherein the process further results in substantially no net production of any materials besides the magnesium metal, water, oxygen, silicon dioxide, and the magnesium metal.

5. A process of producing magnesium metal comprising:
   reacting a magnesium silicate with a caustic material to produce magnesium hydroxide;
   reacting the magnesium hydroxide with a source of carbon dioxide to produce magnesium carbonate;
   reacting the magnesium carbonate to produce a magnesium-containing compound and carbon dioxide, wherein the carbon dioxide produced is recycled to produce the source of carbon dioxide; and
   reacting the magnesium-containing compound to produce magnesium metal.

6. The process according to claim 5 wherein the magnesium silicate comprises serpentine.

7. The process according to claim 5 wherein the magnesium-containing compound comprises magnesium chloride or magnesium oxide.

8. A process of producing magnesium metal comprising:
   (a) reacting a magnesium silicate with a caustic material to produce magnesium hydroxide;
   (b) reacting carbon dioxide with at least one of a caustic alkali-metal hydroxide and an alkali-metal silicate to produce at least one of an alkali-metal carbonate and an alkali-metal bicarbonate;
   (c) reacting the magnesium hydroxide with at least one of the alkali-metal carbonate and the alkali-metal bicarbonate to produce magnesium carbonate;
   (d) reacting the magnesium carbonate to produce a magnesium-containing compound and carbon dioxide; and
   (e) reacting the magnesium-containing compound to produce magnesium metal.

9. The process according to claim 8 wherein the carbon dioxide produced in process step (d) is recycled as a reactant in process step (b).

10. The process according to claim 8 wherein the magnesium silicate comprises serpentine.

11. The process according to claim 8 wherein the magnesium-containing compound comprises magnesium chloride or magnesium oxide.

12. The process according to claim 8 wherein the reactions (b) and (c) are conducted at a pressure not greater than about 50 bars above the vapor pressure of pure water for the temperature of the reaction.

* * * * *

UNITED STATES PATENT AND TRADEMARK OFFICE
CERTIFICATE OF CORRECTION

PATENT NO.         : 7,666,250 B1                                                      Page 1 of 1
APPLICATION NO.    : 11/119536
DATED              : February 23, 2010
INVENTOR(S)        : James G. Blencoe et al.

It is certified that error appears in the above-identified patent and that said Letters Patent is hereby corrected as shown below:

Column 10, line 12, delete "the magnesium metal,"

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,666,250 B1  Page 1 of 1
APPLICATION NO. : 11/119536
DATED : February 23, 2010
INVENTOR(S) : James G. Blencoe et al.

It is certified that error appears in the above-identified patent and that said Letters Patent is hereby corrected as shown below:

Title page (*) Notice

Delete "by 674 days" – and insert --by 1303 days--

Signed and Sealed this

Twenty-fourth Day of August, 2010

David J. Kappos
*Director of the United States Patent and Trademark Office*